(12) United States Patent
Liu et al.

(10) Patent No.: US 11,875,584 B2
(45) Date of Patent: Jan. 16, 2024

(54) METHOD FOR TRAINING A FONT GENERATION MODEL, METHOD FOR ESTABLISHING A FONT LIBRARY, AND DEVICE

(71) Applicant: Beijing Baidu Netcom Science Technology Co., Ltd., Beijing (CN)

(72) Inventors: Jiaming Liu, Beijing (CN); Licheng Tang, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 26 days.

(21) Appl. No.: 17/682,131

(22) Filed: Feb. 28, 2022

(65) Prior Publication Data
US 2023/0114293 A1 Apr. 13, 2023

(30) Foreign Application Priority Data
Sep. 9, 2021 (CN) .......................... 202111056558.8

(51) Int. Cl.
*G06V 30/244* (2022.01)
*G06V 30/19* (2022.01)
*G06T 11/20* (2006.01)

(52) U.S. Cl.
CPC .......... *G06V 30/245* (2022.01); *G06T 11/203* (2013.01); *G06V 30/1916* (2022.01);
(Continued)

(58) Field of Classification Search
CPC .......... G06V 30/245; G06V 30/19127; G06V 30/19147; G06V 30/1916; G06V 30/19173; G06T 11/203
See application file for complete search history.

(56) References Cited

U.S. PATENT DOCUMENTS

| | | | |
|---|---|---|---|
| 6,760,029 B1* | 7/2004 | Phinney | G06K 15/02 345/468 |
| 2008/0025610 A1* | 1/2008 | Abdulkader | G06V 30/262 382/185 |

(Continued)

FOREIGN PATENT DOCUMENTS

| | | |
|---|---|---|
| CN | 110503598 A | 11/2019 |
| CN | 110516577 A | 11/2019 |

(Continued)

OTHER PUBLICATIONS

Xi et al., "JointFontGAN Joint Geometry-Content GAN for Font Generation via Few-Shot Learning", Proceedings of the 28th ACM International Conference on Multimedia, ACMPUB27, New York, NY, USA, Oct. 12, 2020 (Oct. 12, 2020), pp. 4309-4317, DOI: 10.1145/3394171.3413705.

(Continued)

*Primary Examiner* — Terrell M Robinson
(74) *Attorney, Agent, or Firm* — KDW Firm PLLC

(57) ABSTRACT

Provided are a method for training a font generation model, a method for establishing a font library, and a device. The method for training a font generation model includes the following steps. A source-domain sample character is input into the font generation model to obtain a first target-domain generated character. The first target-domain generated character is input into a font recognition model to obtain the target adversarial loss of the font generation model. The model parameter of the font generation model is updated according to the target adversarial loss.

16 Claims, 10 Drawing Sheets

(52) U.S. Cl.
CPC .. *G06V 30/19127* (2022.01); *G06V 30/19147* (2022.01); *G06V 30/19173* (2022.01)

(56) References Cited

U.S. PATENT DOCUMENTS

| | | | | |
|---|---|---|---|---|
| 2015/0097842 | A1* | 4/2015 | Kaasila | G06F 18/214 |
| | | | | 345/471 |
| 2016/0264633 | A1* | 9/2016 | Simon | A61K 38/17 |
| 2019/0147304 | A1* | 5/2019 | Liu | G06F 18/2148 |
| | | | | 382/157 |

FOREIGN PATENT DOCUMENTS

| | | | | | |
|---|---|---|---|---|---|
| CN | 112633430 | A | | 4/2021 | |
| CN | 112861806 | A | | 5/2021 | |
| CN | 113140018 | A | * | 7/2021 | ......... G06K 9/00402 |
| CN | 113140018 | A | | 7/2021 | |
| JP | 2021026191 | A | * | 2/2021 | ......... G06K 9/00402 |
| JP | 2021026191 | A | | 2/2021 | |

OTHER PUBLICATIONS

Xie et al., "DG-Font: Deformable Generative Networks for Unsupervised Font Generation", 2021 IEEE/CVF Conference on Computer Vision and Pattern Recognition (CVPR), IEEE Jun. 20, 2021 (Jun. 20, 2021), pp. 5126-5136, DOI: 10.1109/CVPR46437.2021.00509.

European Search Report and Written Opinion, dated Jul. 21, 2022, for Application No. EP 22158661.3 (eight (8) pages).

Notice of Reasons for Refusal dated Jan. 24, 2023, for Japanese Patent Application No. 2022-007116 (14 pages).

Liu et al., "FontGAN: A Unified Generative Framework for Chinese Character Stylization and De-stylization" arXiv:1910.12604v1 [cs.CV] Oct. 28, 2019.

First Office Action for Chinese Application No. 202111056558.8, dated May 25, 2023, 15 pages.

First Search Report for Chinese Application No. 202111056558.8, dated May 25, 2023, 5 pages.

* cited by examiner

METHOD FOR TRAINING A FONT GENERATION MODEL, METHOD FOR ESTABLISHING A FONT LIBRARY, AND DEVICE

CROSS-REFERENCE TO RELATED APPLICATIONS

This application claims priority to Chinese patent application No. 202111056558.8 filed with the China National Intellectual Property Administration (CNIPA) on Sep. 9, 2021, the disclosure of which is incorporated herein by reference in its entirety.

TECHNICAL FIELD

The present disclosure relates to the field of artificial intelligence technology and, in particular, to the field of computer vision and deep learning technology, and may be applied to optical character recognition (OCR) and other scenarios.

BACKGROUND

Font generation has been a focus of research by many researchers at home and abroad and has a wide application value in the font design industry. Therefore, how to satisfy the font generation requirement of style diversity has become a key issue in the field of font generation.

SUMMARY

Embodiments of the present disclosure provide a method for training a font generation model, a method for establishing a font library, and a device, which can improve the ability of the font generation model to learn a font feature. Therefore, the aesthetic of a font generated by the font generation model can be improved, and thus the ability of the font generation model to generate a font-level font can be improved.

The present disclosure provides a method for training a font generation model. The method includes the steps below.

A source-domain sample character is input into the font generation model to obtain a first target-domain generated character.

The first target-domain generated character is input into a font recognition model to obtain a target adversarial loss of the font generation model.

A model parameter of the font generation model is updated according to the target adversarial loss.

The present disclosure further provides a method for establishing a font library. The method includes the steps below.

A source-domain input character is input into a font generation model to obtain a target-domain new character.

The font library is established based on the target-domain new character.

The font generation model is obtained by being trained using the method for training a font generation model described above.

The present disclosure further provides an electronic device. The electronic device includes at least one processor and a memory communicatively connected to the at least one processor.

The memory stores an instruction executable by the processor to enable the processor to execute the method for training a font generation model according to the above embodiments or execute the method for establishing a font library according to the above embodiments.

The present disclosure further provide a non-transitory computer-readable storage medium storing a computer instruction to enable the computer to execute the method for training a font generation model according to the above embodiments or execute the method for establishing a font library according to the above embodiments.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Exemplary embodiments of the present disclosure, including details of embodiments of the present disclosure, are described hereinafter in conjunction with the drawings to facilitate understanding. The exemplary embodiments are merely illustrative. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

Font generation is an emerging task in the field of image style transfer. The image style transfer refers to the conversion of an image into an image of another style while the content is kept unchanged. The image style transfer is a popular research direction in a deep learning application.

At present, a generative adversarial network (GAN) model may be adopted to perform the font generation. However, in a font generation scheme based on the GAN model, through the network trained with a relatively small data volume, only some relatively weak features, such as tilt, size and part of strokes, can be learned, while the most user-style features cannot be learned. The network trained with a relatively large data volume may also be used. Although this network is relatively strong in style, an incorrect character is easy to generate for a Chinese character outside a training set. Although some GAN models can generate fonts with correct shapes, fonts with only correct shapes cannot satisfy the requirements of professional fonts. Therefore, according to these mainstream research results of the font generation, a font-level effect is difficult to achieve.

Figure 1:
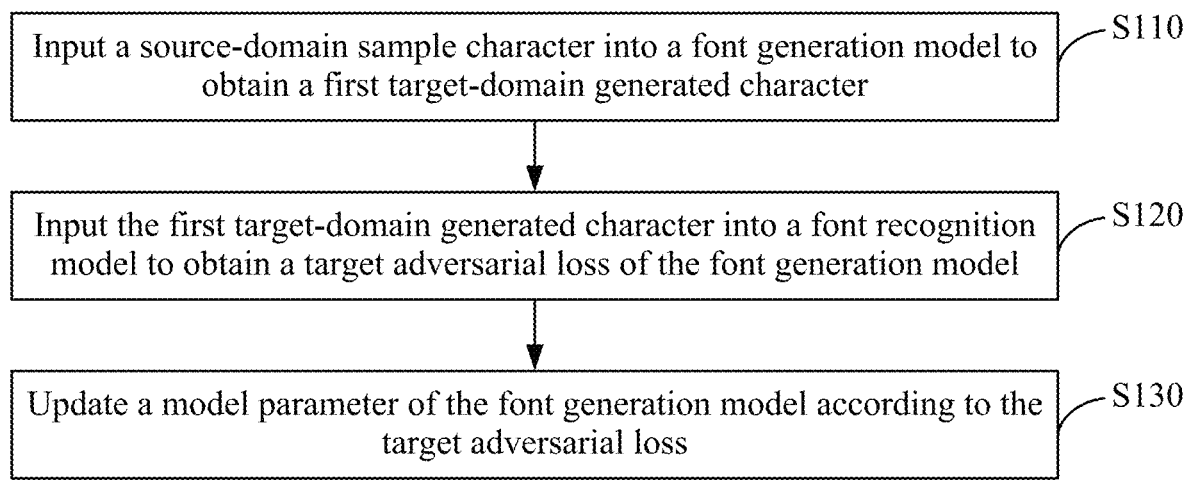
FIG. 1 is a flowchart of a method for training a font generation model according to an embodiment of the present disclosure.

In an example, FIG. 1 is a flowchart of a method for training a font generation model according to an embodiment of the present disclosure. This embodiment may be applied to a case where the font generation model is trained and optimized according to an adversarial loss. This method may be executed by an apparatus for training a font generation model. The apparatus may be performed by software and/or hardware and may generally be integrated in an electronic device. The electronic device may be a terminal device, a server device, or the like. The type of electronic device that performs the method for training a font generation model is not limited in the embodiments of the present disclosure. Accordingly, as shown in FIG. 1, the method includes the operations below.

In S110, a source-domain sample character is input into the font generation model to obtain a first target-domain generated character.

In an embodiment of the present disclosure, the source-domain sample character may be an image having a target source-domain font style. A target source-domain may be a certain source-domain font style. The source-domain font style may be a regular real font such as regular script, Song, or bold. That is, the target source-domain may be any real font style such as regular script, Song, bold or other regular real fonts. The first target-domain generated character may be an image having a target-domain font style. The target-domain font style may be a style type that needs to be generated, such as a user's handwritten font or other artistic fonts. The font generation model may generate a font having the target-domain font style.

In this embodiment of the present disclosure, when the font generation model is trained, one type of source-domain sample character may be first input into the font generation model. The font generation model may output the first target-domain generated character corresponding to the source-domain sample character according to the input source-domain sample character.

For example, an image including a Chinese character "做" in regular script may be used as the source-domain sample character and input into the font generation model. The font generation model may output an image including a user's handwritten Chinese character "做".

In S120, the first target-domain generated character is input into a font recognition model to obtain a target adversarial loss of the font generation model.

The font recognition model may be a model that refines the font aesthetics of the first target-domain generated character. The target adversarial loss may be an adversarial loss obtained by calculating the first target-domain generated character through the font recognition model and may be configured to measure the similarity between the first target-domain generated character and a real font. In an embodiment, the font recognition model may be a discriminator model.

At present, some existing font generation schemes based on deep learning, especially the font generation scheme based on the GAN, can generate Chinese characters with correct shapes. However, Chinese characters with only correct shapes cannot satisfy the requirements of professional fonts. While making the font style satisfy the requirements, the professional fonts need to control the shaking of strokes to be stabilized in a small range. Therefore, the generated font is more in line with the requirements of the fonts.

In this embodiment of the present disclosure, the font generation model is supervised through the introduction of the font recognition model. After the font generation model generates the corresponding first target-domain generated character according to the source-domain sample character, the font recognition model is configured to calculate the first target-domain generated character to obtain the target adversarial loss to measure the similarity between the first target-domain generated character and the real font. In this manner, the training process of the font generation model is assisted, and the font generation model can generate a font-level font.

For example, the training process of the font generation model is supervised by the font recognition model. Thus, the font generated by the font generation model can avoid an error of the stroke connection law and the shaking of the strokes to the greatest extent. In this manner, the aesthetics of the generated font is maintained.

In S130, the model parameter of the font generation model is updated according to the target adversarial loss.

The model parameter may be, for example, the relevant parameter of the font generation model such as weight or bias. The type of model parameter is not limited in the embodiments of the present disclosure.

In an embodiment, before the font generation model is trained, all source-domain sample characters configured to train the font generation model may be uniformly stored in a character table. It is to be understood that all source-domain sample characters in the character table may belong to a real type of font. That is, each type of font generation model may convert a real font into a font having the target-domain font style. Accordingly, in the process of training the font generation model, when the font generation model generates the first target-domain generated character according to a source-domain sample character in the character table, the target adversarial loss of the first target-domain generated character may be calculated by the font recognition model to optimize the generated first target-domain generated character through the use of the calculated target adversarial loss. For example, the parameter of the font generation model is adjusted and updated, and an updated cyclic generation network model is obtained. For the next source-domain sample character, by using the updated font generation model, the operation in which the source-domain sample character is input into the font generation model and the first target-domain generated character is obtained is returned and executed to repeatedly train the font generation model under the supervision of the font recognition model.

In this embodiment of the present disclosure, the font recognition model optimizes all source-domain sample characters in the character table, which may be used as one round of optimization of the font generation model. The model parameter of the font generation model is updated through the font recognition model for multiple rounds to constantly update the font generation model. In this manner, the supervision of the training of the font generation model is achieved, and the font generation model can generate a font-level font. Therefore, the aesthetic of a font generated by the font generation model can be improved.

In this embodiment of the present disclosure, the source-domain sample character is input into the font generation model to obtain the first target-domain generated character, and the first target-domain generated character is input into the font recognition model to obtain the target adversarial loss of the font generation model. Then, the model parameter of the font generation model is updated for multiple rounds according to the target adversarial loss to perform the training of the font generation model. After the training of the font generation model is completed, a source-domain input character may be input into the font generation model to obtain a target-domain new character, and the font library is established based on the target-domain new character, thus solving that the existing font generation model is difficult to generate a font-level font. In this manner, the ability of the font generation model to learn the font feature can be improved. Therefore, the aesthetic of a font generated by the font generation model can be improved, and thus the ability of the font generation model to generate a font-level font can be improved.

Figure 2:
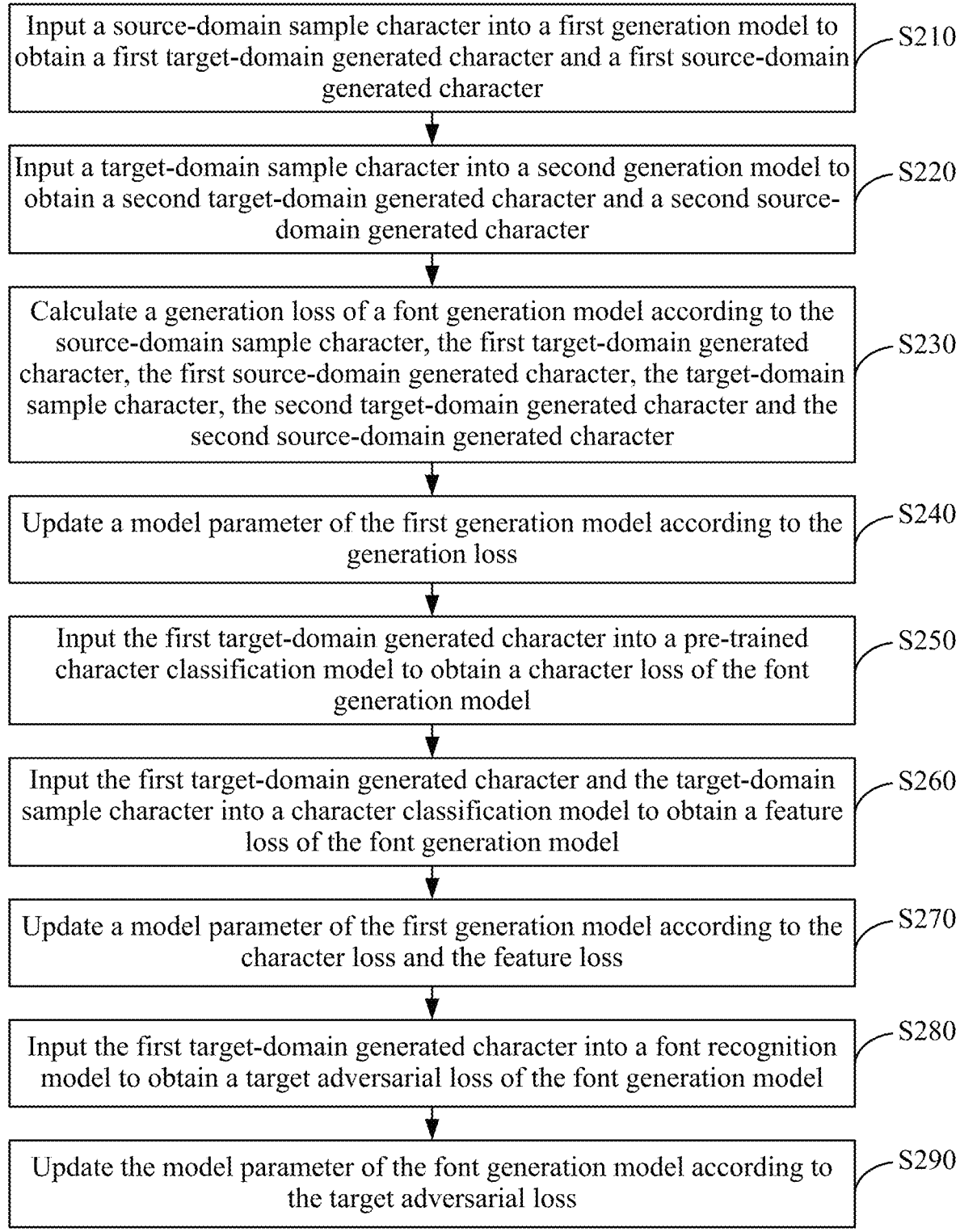
FIG. 2 is a flowchart of a method for training a font generation model according to an embodiment of the present disclosure.

In an example, FIG. 2 is a flowchart of a method for training a font generation model according to an embodiment of the present disclosure. This embodiment of the present disclosure is an optimization and improvement on the basis of the technical schemes of the preceding embodiments and provides multiple implementations for inputting the source-domain sample character into the font generation model to obtain the first target-domain generated character; training the font recognition model and the font generation model; and updating the model parameter of the font generation model.

As shown in FIG. 2, a method for training a font generation model includes the steps below.

In S210, the source-domain sample character is input into a first generation model to obtain the first target-domain generated character and a first source-domain generated character.

The font generation model may be a cyclic network generation model and includes a first generation model and a second generation model. The first source-domain generated character may be an image that has a source-domain font style and is generated by the font generation model according to the source-domain sample character.

In S220, a target-domain sample character is input into the second generation model to obtain a second target-domain generated character and a second source-domain generated character.

The target-domain sample character may be an image having a target-domain font style. For example, the first target-domain generated character is an image that includes a handwritten Chinese character "做" and is generated by the font generation model. The target-domain sample character is a real image including the handwritten Chinese character "做". The real image including the handwritten Chinese character "做" may be an image generated by a real user's handwritten Chinese character. The image generated by the real user's handwritten Chinese character may be obtained from a public data set or obtained upon user authorization. The second target-domain generated character may be an image that has the target-domain font style and is generated by the font generation model. The second source-domain generated character may be an image that has the source-domain font style and is generated by the font generation model according to the target-domain sample character.

In S230, the generation loss of the font generation model is calculated according to the source-domain sample character, the first target-domain generated character, the first source-domain generated character, the target-domain sample character, the second target-domain generated character and the second source-domain generated character.

The generation loss may be the loss of a generation model of the font generation model.

In S240, the model parameter of the first generation model is updated according to the generation loss. In an embodiment of the present disclosure, the font generation model may include a first generation model, a second generation model, a first discrimination model and a second discrimination model.

In S250, the first target-domain generated character is input into a pre-trained character classification model to obtain a character loss of the font generation model.

The character classification model may be a model that refines the accuracy of the first target-domain generated character. The character loss may be an incorrect character loss obtained by calculating the first target-domain generated character through the character classification model and may constrain the incorrect character rate of the first target-domain generated character output by the cyclic network generation model. In an embodiment, the character classification model may be obtained by being trained using an oxford visual geometry group (VGG) 19 network. The training samples for the character classification model may be images including multiple fonts. For example, the training samples may be about 450,000 images including more than 80 fonts and more than 6,700 characters.

To reduce the incorrect character rate of the font generation model, in addition to using the generation loss of the font generation model to train the font generation model, after the self-training of the font generation model is completed, the pre-trained character classification model may also be configured to supervise the training process of the font generation model. The first target-domain generated character generated by the font generation model is input into the pre-trained character classification model to obtain the character loss of the font generation model.

In an embodiment of the present disclosure, that the first target-domain generated character is input into the pre-trained character classification model to obtain the character loss of the font generation model may include inputting the first target-domain generated character into the character classification model to obtain a generated-character vector of the first target-domain generated character; and calculating the character loss according to a difference between the generated-character vector and a preset standard character vector.

The first target-domain generated character is input into the preceding character classification model. The preceding character classification model may output the generated-character vector $\overline{X}=[x_0, x_1 \ldots x_i \ldots x_n]$ of the first target-domain generated character. A standard character $\overline{Y}=[y_0, y_1 \ldots y_i \ldots y_n]$ is preset for the preceding first target-domain generated character. $x_i$ denotes an element with a subscript i in the generated-character vector. $y_i$ denotes an element with the subscript i in the standard character vector. i denotes an integer greater than or equal to 0 and less than or equal to n. n denotes the number of elements in the generated-character vector $\overline{X}$ and in the standard character vector $\overline{Y}$.

According to the difference between the standard character vector $\overline{Y}$ and the generated-character vector $\overline{X}$ of the first target-domain generated character, the character loss of the font generation model may be determined.

The first target-domain generated character is input into the character classification model to obtain the generated-character vector $\overline{X}=[x_0, x_1 \ldots x_i \ldots x_n]$ of the first target-domain generated character. Each element in the vector $\overline{X}$ may denote one character in the training sample. n denotes the number of characters in the training sample. For example, when the training sample has 6,761 characters, n may be equal to 6,760.

The standard character vector $\overline{Y}=[y_0, y_1 \ldots y_i \ldots y_n]$ is preset for the preceding first target-domain generated character. Each element in the vector $\overline{Y}$ may denote one character in the training sample. n denotes the number of characters in the training sample. For example, when the training sample has 6,761 characters, n may be equal to 6,760.

The standard character vector $\overline{Y}$ denotes a vector that should be output by the preceding character classification model when the first target-domain generated character is input into the preceding character classification model. For example, the first target-domain generated character is a Chinese character "傲",, and the Chinese character "傲" is the first of the n characters in the training sample. Thus, the standard character vector of the Chinese character "傲" may be denoted as $\overline{Y}=[1, 0,0, \ldots 0]$.

In an embodiment of the present disclosure, the calculation of the character loss may include calculating the character loss according to the following formula:

$$LC = -\sum_0^n x_i \log y_i$$

LC denotes the character loss. $x_i$ denotes the element with the subscript i in the generated-character vector. $y_i$ denotes the element with the subscript i in the standard character vector. i denotes an integer greater than or equal to 0 and less than or equal to n. n denotes the number of elements in the generated-character vector and in the standard character vector.

In the preceding technical schemes, the character loss of the font generation model is calculated to constrain the incorrect character rate of the first target-domain generated character output by the font generation model. Thus, the probability that the font generation model generates an incorrect character is reduced, and the accuracy of the font generation model is improved.

In S260, the first target-domain generated character and the target-domain sample character are input into the character classification model to obtain a feature loss of the font generation model.

The feature loss may be a difference feature calculated by the character classification model according to the first target-domain generated character and the target-domain sample character. The feature loss can supervise the font generation model to learn more font details.

To further improve the ability of the font generation model to learn a font feature, in addition to using the generation loss and the character loss of the font generation model to train the font generation model, after the self-training of the font generation model is completed, the pre-trained character classification model may also be configured to supervise the training process of the font generation model. The first target-domain generated character generated by the font generation model is input into the pre-trained character classification model to obtain the feature loss of the font generation model.

In an embodiment of the present disclosure, the character classification model includes a plurality of feature layers. That the first target-domain generated character and the target-domain sample character are input into the character classification model to obtain the feature loss of the font generation model may include inputting the first target-domain generated character into the character classification model to obtain a generated-character feature map output by each feature layer of the character classification model; inputting the target-domain sample character into the character classification model to obtain a sample character feature map output by each feature layer of the character classification model; and calculating the difference between the generated-character feature map of a target feature layer and the sample character feature map of the target feature layer to obtain the feature loss.

The generated-character feature map may be a feature map of a generated character output by each feature layer of the character classification model. The sample character feature map may be a feature map of a sample character output by each feature layer of the character classification model. The target feature layer may be one or more feature layers of the character classification model.

The character classification model may include a plurality of feature layers (for example, 90 feature layers). The first target-domain generated character is input into the character classification model to obtain the generated-character feature map output by each layer. The target-domain sample character is input into the character classification model to obtain the sample character feature map output by each layer.

The feature loss of each feature layer may be determined according to the difference between the generated-character feature map output by the corresponding layer and the sample character feature map output by the corresponding layer. For example, in each feature layer, a difference is calculated between the pixel value of each pixel of the generated-character feature map output by the feature layer and the pixel value of a corresponding pixel of the sample character feature map output by the feature layer, and the absolute value of the difference is calculated. In this manner, the difference of each pixel is obtained. The differences between all pixels and the corresponding pixels are summed to obtain the pixel loss of the feature layer.

In an embodiment, at least one of the plurality of feature layers (for example, a $45^{th}$ layer and a $46^{th}$ layer) may be selected as the target feature layer, and the sum of the feature losses of all target feature layers is selected as the overall feature loss.

The preceding overall feature loss may be configured to represent that the font generation model learns features with large differences between the first target-domain generated character and the target-domain sample character. Therefore, the font generation model can learn more font details, and the ability of the font generation model to learn the font feature can be improved.

In an embodiment of the present disclosure, that the difference between the generated-character feature map of the target feature layer and the sample character feature map of the target feature layer is calculated may include calculating an absolute value of a difference value between a pixel value of a pixel at each position in the generated-character feature map and a pixel value of a pixel at the corresponding position in the sample character feature map to obtain the difference between the pixel at each position in the generated-character feature map and the pixel at the corresponding position in the sample character feature map; and determining the pixel difference between the generated-character feature map and the sample character feature map according to the differences between pixels at a plurality of positions in the generated-character feature map and pixels at the corresponding positions in the sample character feature map.

In S270, the model parameter of the first generation model is updated according to the character loss and the feature loss.

In this embodiment of the present disclosure, after the self-training of the font generation model is completed through the use of the generation loss, the character classification model may be further configured to calculate the character loss and feature loss of the font generation model respectively to update the model parameter of the first generation model in the font generation model according to the character loss and the feature loss, thus continuing to supervise and train the font generation model.

In the preceding technical schemes, the model parameter of the first generation model is updated through the use of the character loss and the feature loss to perform the supervision and the training of the font generation model. Thus, the probability that the font generation model generates an incorrect character can be reduced, and the accuracy of a font generated by the font generation model and the ability of the font generation model to learn the font feature can be improved.

In S280, the first target-domain generated character is input into the font recognition model to obtain the target adversarial loss of the font generation model.

In an embodiment of the present disclosure, before the first target-domain generated character is input into the font recognition model, the method for training a font generation model may further include acquiring various types of source-domain sample characters and using the various types of source-domain sample characters as real sample characters; using the first target-domain generated character as a fake character; and training a binary classification model according to the real sample characters and the fake character to obtain the font recognition model.

The binary classification model may discriminate the real and fake categories of input samples.

Before the font recognition model is configured to calculate the target adversarial loss of the font generation model, the font recognition model needs to be pre-trained. The real fonts of a series of source-domain sample characters may be collected as the real sample characters, and the first target-domain generated character generated by the font generation model may be used as the fake sample character. It is to be understood that the first target-domain generated characters generated by different font generation models may be collected as fake sample characters corresponding to different series of source-domain sample characters. After the real sample characters and the fake sample characters are obtained, the real sample characters and the fake sample characters may be used as training samples to train the binary classification model, and the successfully-trained binary classification model may be used as the font recognition model.

In the training process of the font recognition model, the discrimination loss of the font recognition model itself may be used as a loss function. Accordingly, the expression of the target adversarial loss generated by the font recognition model may be expressed as $(Y_0{}^*-1)^2$. $Y_0$ may denote the output obtained after the first target-domain generated character input into the font recognition model.

The real sample characters and the fake sample characters may be configured to be used as the training samples to train the binary classification model. Therefore, the binary classification model can have the ability to discriminate whether the font of the first target-domain generated character generated by the font generation model is close to the real font.

In S290, the model parameter of the font generation model is updated according to the target adversarial loss.

It is to be noted that FIG. 2 is merely a diagram of one implementation. There is no execution order between steps S250 to S260 and step S280. Steps S250 to S260 may be performed before step S280. Alternatively, step S280 may be performed before steps S250 to S260. Alternatively, the preceding operations may also be performed simultaneously. There is also no execution order between step S250 and step S260. Similarly, there is also no execution order between step S270 and step S290. Step S270 may be performed before step S290. Alternatively, step S290 may be performed before step S270. Alternatively, the preceding operations may also be performed simultaneously.

In an embodiment of the present disclosure, that the model parameter of the font generation model is updated according to the target adversarial loss may include updating the model parameter of the first generation model for multiple rounds according to the target adversarial loss until the first generation model is determined to satisfy a model stability condition. The model stability condition includes that the current number of updates of the first generation model reaches the set number of times.

The set number of times may be set according to the training requirements of the model, such as 5 or 8 times. The specific value of the set number of times is not limited in the embodiments of the present disclosure.

In an embodiment, the model parameter of the first generation model of the font generation model is updated for multiple rounds according to the target adversarial loss until it is determined to reach the set number of updates.

Figure 3:
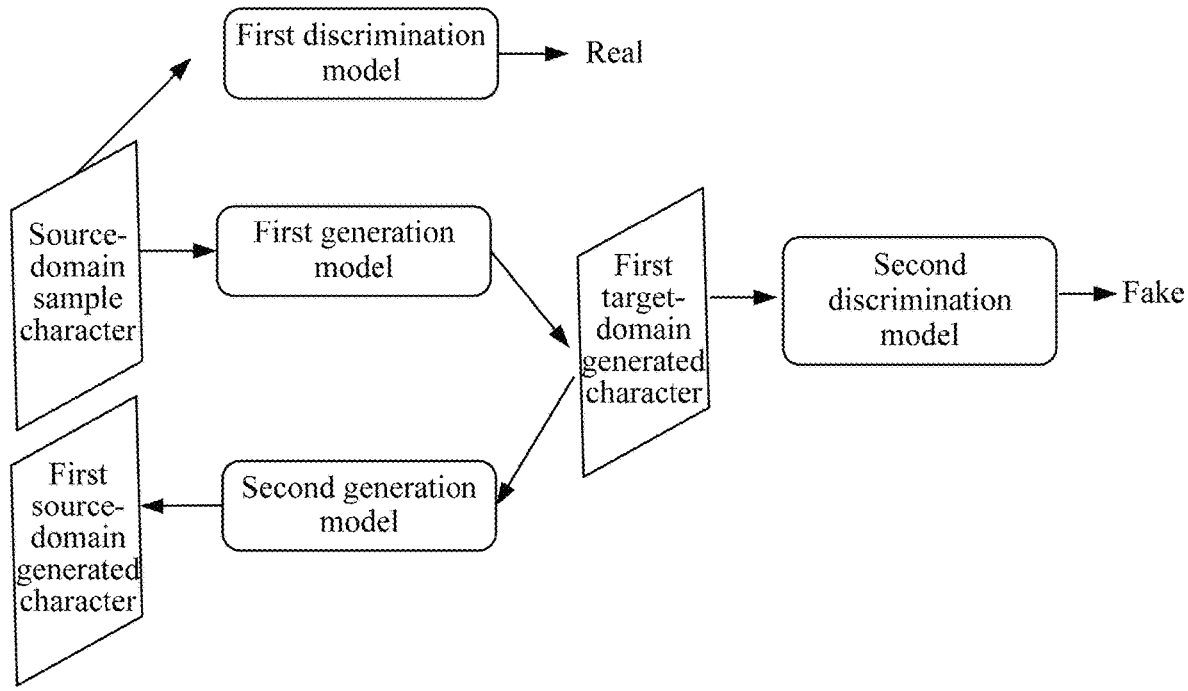
FIG. 3 is a principle diagram of the network structure of a font generation model according to an embodiment of the present disclosure.
Figure 4:
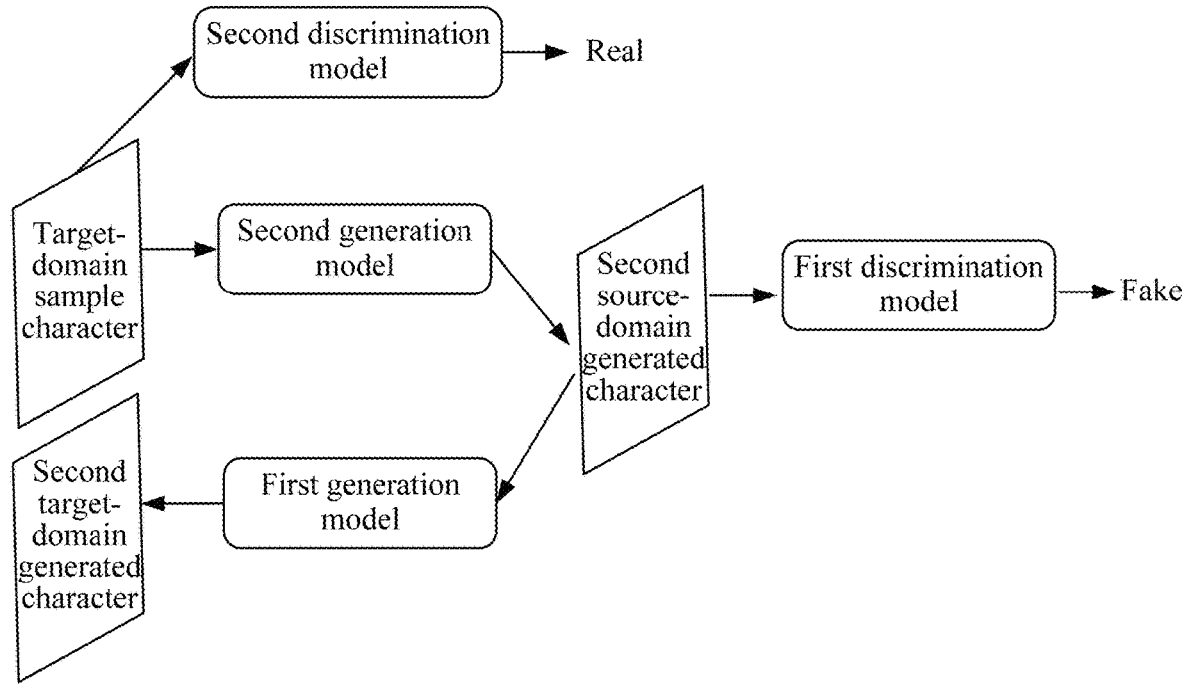
FIG. 4 is a principle diagram of the network structure of a font generation model according to an embodiment of the present disclosure.

FIGS. 3 and 4 are principle diagrams illustrating the network structure of a font generation model according to an embodiment of the present disclosure. In an example, as shown in FIGS. 3 and 4, in this embodiment of the present disclosure, the font generation model may include a first generation model, a second generation model, a first discrimination model and a second discrimination model. The first generation model is configured to convert an image that has the source-domain font style into an image that has the target-domain font style. The second generation model is configured to convert an image that has the target-domain font style into an image that has the source-domain font style. The first discrimination model is configured to discriminate whether the converted image belongs to the source-domain font style. The second discrimination model is configured to discriminate whether the converted image belongs to the target-domain font style.

Based on the structure of the preceding font generation model, the font generation model may include two cyclic working processes. FIG. 3 shows the first cyclic working process of the font generation model: the source-domain sample character is input into the first generation model to obtain the first target-domain generated character; and the first target-domain generated character is input into the second generation model to obtain the first source-domain generated character. FIG. 4 shows the second cyclic working process of the font generation model: the target-domain sample character is input into the second generation model to obtain the second source-domain generated character; and the second source-domain generated character is input into the first generation model to obtain the second target-domain generated character. Thus, samples of the font generation model may be unpaired images, and there is no need to establish a one-to-one mapping between training data.

In this embodiment of the present disclosure, the loss of the font generation model includes a generation loss and a discrimination loss. In the following, the calculation method of the generation loss of the font generation model and the calculation method of the discrimination loss of the font generation model are described by using an example in which a user's handwritten character is used as the target-domain font style.

FIG. 3 shows the first cyclic working process of the font generation model: the source-domain sample character (for example, an image including a character in regular script, a regular script character image for short) is input into the first generation model to obtain the first target-domain generated character (for example, an image including a handwritten character, a handwritten character image for short). The first target-domain generated character (the handwritten character image) is input into the second generation model to obtain the first source-domain generated character (a regular script character image).

During the first cyclic working process, the source-domain sample character is a real regular script character image, while the first source-domain generated character is a regular script character image generated by the model. The regular script character image generated by the model may be referred to as a fake regular script character image. The first target-domain generated character is a handwritten character image generated by the model. The handwritten character image generated by the model may be referred to as a fake handwritten character image. During a training process, the source-domain sample character may be marked as Real (for example, the value of the character is 1), and the first target-domain generated character may be marked as Fake (for example, the value of the character is 0).

The source-domain sample character is input to the first discrimination model. For the first discrimination model, the expected output should be 1. If the actual output of the first discrimination model is X, and the loss of the first discrimination model is calculated through the mean square deviation, a part of the loss of the first discrimination model may be expressed as $(X-1)^2$.

The first target-domain generated character is input into the second discrimination model. For the second discrimination model, the expected output should be 0. If the actual output of the second discrimination model is Y* (for convenience of differentiation, a parameter with * may represent that the parameter is related to an image generated by the model, and a parameter without * represents that the parameter is related to a real image), and the loss of the second discrimination model is calculated by using the mean square deviation, a part of the loss of the second discrimination model may be expressed as $(Y^*-0)^2$.

The first target-domain generated character is input into the second discrimination model. For the first generation model, the output of the second discrimination model is expected to be 1. If the actual output of the second discrimination model is Y*, and the loss of the first generation model is calculated by using the mean square deviation, a part of the loss of the first generation model may be expressed as $(Y^*-1)^2$. This loss may be the adversarial loss of the first generation model.

To ensure that the first source-domain generated character obtained by inputting the source-domain sample character into the first generation model only has style conversion, and the content is kept unchanged, a cycle-consistency loss may be added for the first generation model. This loss may be calculated according to the difference between the source-domain sample character and the first source-domain generated character. For example, a difference is made between the pixel value of each pixel in the image of the source-domain sample character and the pixel value of a corresponding pixel in the image of the first source-domain generated character, and the absolute value of the difference is calculated. In this manner, the difference of each pixel is obtained. The differences between all pixels in the image of the source-domain sample character and the corresponding pixels in the image of the first source-domain generated character are summed to obtain the cycle-consistency loss of the first generation model, and the cycle-consistency loss of the first generation model may be denoted as $L1_{A2B}$.

Therefore, one part of the loss of the first generation model is $(Y^*-1)^2$, and the other part of the loss is $L1_{A2B}$. The sum of the two parts of the loss is used as the overall loss $L_{A2B}$ of the first generation model. The overall loss $L_{A2B}$ of the first generation model may be expressed by the following equation (1):

$$L_{A2B}=(Y^*-1)^2+L1_{A2B} \qquad (1)$$

FIG. 4 shows the second cyclic working process of the font generation model: the target-domain sample character (for example, an image including a handwritten character, a handwritten character image for short) is input into the second generation model to obtain the second source-domain generated character (for example, an image including a character in regular script, a regular script character image for short). The second source-domain generated character (the regular script character image) is input into the first generation model to obtain the second target-domain generated character (a handwritten character image).

During the second cyclic working process, the target-domain sample character is a real handwritten character image. The second target-domain generated character is a handwritten character image generated by the model and may be referred to as a fake handwritten character image. The second source-domain generated character is a regular script character image generated by the model and may be referred to as a fake regular script character image. During the training process, the target-domain sample character may be marked as Real (for example, the value of the character is 1), and the second source-domain generated character may be marked as Fake (for example, the value of the character is 0).

The target-domain sample character is input to the second discrimination model. For the second discrimination model, the expected output should be 1. If the actual output of the second discrimination model is Y, and the loss of the second discrimination model is calculated by using the mean square deviation, a part of the loss of the second discrimination model may be expressed as $(Y-1)^2$.

The second source-domain generated character is input into the first discrimination model. For the first discrimination model, the expected output should be 0. If the actual output of the first discrimination model is X*, and the loss of the first discrimination model is calculated by using the mean square deviation, a part of the loss of the first discrimination model may be expressed as $(X^*-0)^2$.

The second source-domain generated character is input into the first discrimination model. For the second generation model, the output of the first discrimination model is expected to be 1. If the actual output of the first discrimination model is X*, and the loss of the second generation model is calculated by using the mean square deviation, a part of the loss of the second generation model may be expressed as $(X^*-1)^2$.

To ensure that the second target source-domain generated character obtained by inputting the target-domain sample character into the second generation model merely has style conversion, and the content is kept unchanged, a cycle-consistency loss may be added for the second generation model. The loss may be calculated according to the difference between the target-domain sample character and the second target-domain generated character. For example, a difference is made between the pixel value of each pixel in the image of the target-domain sample character and the pixel value of the corresponding pixel in the image of the second target-domain generated character, and the absolute value of the difference is calculated. In this manner, the difference of each pixel is obtained. The differences between all pixels in the image of the target-domain sample character and corresponding pixels in the image of the second target-domain generated character are summed to obtain the cycle-consistency loss of the second generation model. The cycle-consistency loss may be denoted as $L1_{B2A}$.

Therefore, one part of the loss of the first generation model is $(X^*-1)^2$, and the other part of the loss is $L1_{B2A}$. The sum of the two parts of the loss is used as the overall loss $L_{B2A}$ of the first generation model. The overall loss $L_{B2A}$ of the first generation model may be expressed by the following equation (2):

$$L_{B2A}=(X^*-1)^2+L1_{B2A} \quad (2)$$

The sum of the overall loss $L_{A2B}$ of the first generation model and the overall loss $L_{B2A}$ of the second generation model may be used as the generation loss of the font generation model. The generation loss may be expressed by the following equation (3):

$$L_G=(Y^*-1)^2+L1_{A2B}+(X^*-1)^2+L1_{B2A} \quad (3)$$

L G denotes the generation loss of the font generation model and may be configured to adjust the model parameter of the first generation model and the model parameter of the second generation model.

The discrimination loss of the font generation model includes the discrimination loss of the first discrimination model and the discrimination loss of the second discrimination model.

One part of the loss of the first discrimination model calculated according to FIG. 3 is $(X-1)^2$, and the other part of the loss of the first discrimination model calculated according to FIG. 4 is $(X^*-0)^2$. The sum of the two parts of the loss may be used as the discrimination loss of the first discrimination model. The discrimination loss L A of the first discrimination model may be expressed by the following equation (4):

$$L_A=(X-1)^2+(X^*-0)^2 \quad (4)$$

The discrimination loss $L_A$ of the first discrimination model may be configured to adjust the model parameter of the first discrimination model.

Similarly, one part of the loss of the second discrimination model calculated according to FIG. 3 is $(Y^*-0)^2$, and the other part of the loss of the second discrimination model calculated according to FIG. 4 is $(Y-1)^2$. The sum of the two parts of the loss may be used as the discrimination loss of the second discrimination model. The discrimination loss L B of the second discrimination model may be expressed by the following equation (5):

$$L_B=(Y-1)^2+(Y^*-0)^2 \quad (5)$$

The discrimination loss $L_B$ of the second discrimination model may be configured to adjust the model parameter of the second discrimination model.

In the preceding technical schemes, the model parameter of the first generation model is updated through the use of the generation loss of the font generation model. Therefore, the font generation model can be optimized according to the structure of the font generation model, and the ability of the font generation model to learn the font feature can be improved.

Figure 5A:
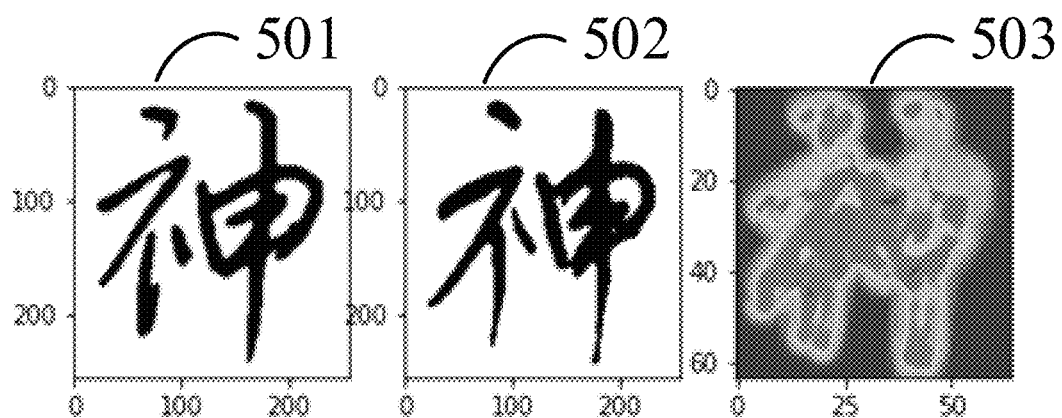
FIGS. 5A-5B are diagrams illustrating the visual effect of a feature loss according to an embodiment of the present disclosure.
Figure 5B:
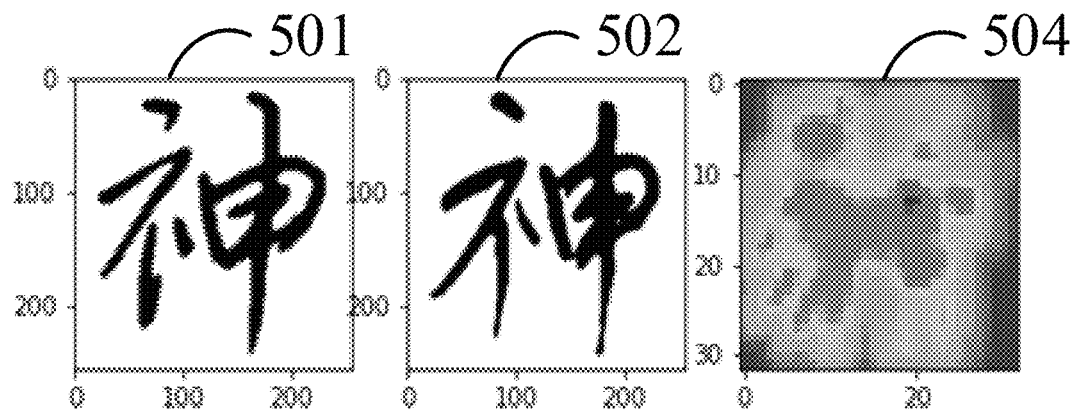

FIGS. 5A-5B are diagrams illustrating the visual effect of a feature loss according to an embodiment of the present disclosure. In an example, as shown in FIG. 5A, a target-domain sample character 501 is a real image including a handwritten Chinese character ""神", ", that is, the Chinese character""神" " in the target-domain sample character 501 is a real user's handwritten character. A first target-domain generated character 502 is an image that includes a handwritten Chinese character ""神" " and is generated by the font generation model. The size of the target-domain sample character 501 and the size of the first target-domain generated character 502 are each 256×256. The target-domain sample character 501 and the first target-domain generated character 502 are input into the character classification model. A sample character feature map and a generated-character feature map are output by the first target feature layer of the character classification model, respectively. The size of the sample character feature map and the size of the generated-character feature map are each 64×64. After the pixel differences between these two 64×64 images are calculated, a heat effect map 503 that shows the differences between the two images is obtained. The heat effect map 503 is also a 64×64 image. The darker the color in the heat effect map 503 is, the greater the difference between the target-domain sample character 501 and the first target-domain generated character 502 is. Therefore, the font generation model focuses more on learning the features of the darker parts in the heat effect map 503, and the ability of the font generation model to learn the font feature can be improved.

Similarly, as shown in FIG. 5B, the target-domain sample character 501 and the first target-domain generated character 502 are input into the character classification model. A sample character feature map and a generated-character feature map are output by the second target feature layer of the character classification model, respectively. The size of the sample character feature map and the size of the generated-character feature map are each 32×32. After the pixel differences between these two 32×32 images are calculated, a heat effect map 504 that shows the differences between the two images is obtained. The heat effect map 504 is also a 32×32 image. The darker the color in the heat effect map 504 is, the greater the difference between the target-domain sample character 501 and the first target-domain generated character 502 is. Therefore, the font generation model focuses more on learning the features of the darker parts in the heat effect map 504, and the ability of the font generation model to learn the font feature can be improved.

It is to be understood that the heat effect map 503 and the heat effect map 504 may be combined to make the font generation model learn the features of the great differences between the target-domain sample character 501 and the first target-domain generated character 502. Therefore, the ability of the font generation model to learn the font feature can be improved.

Figure 6:
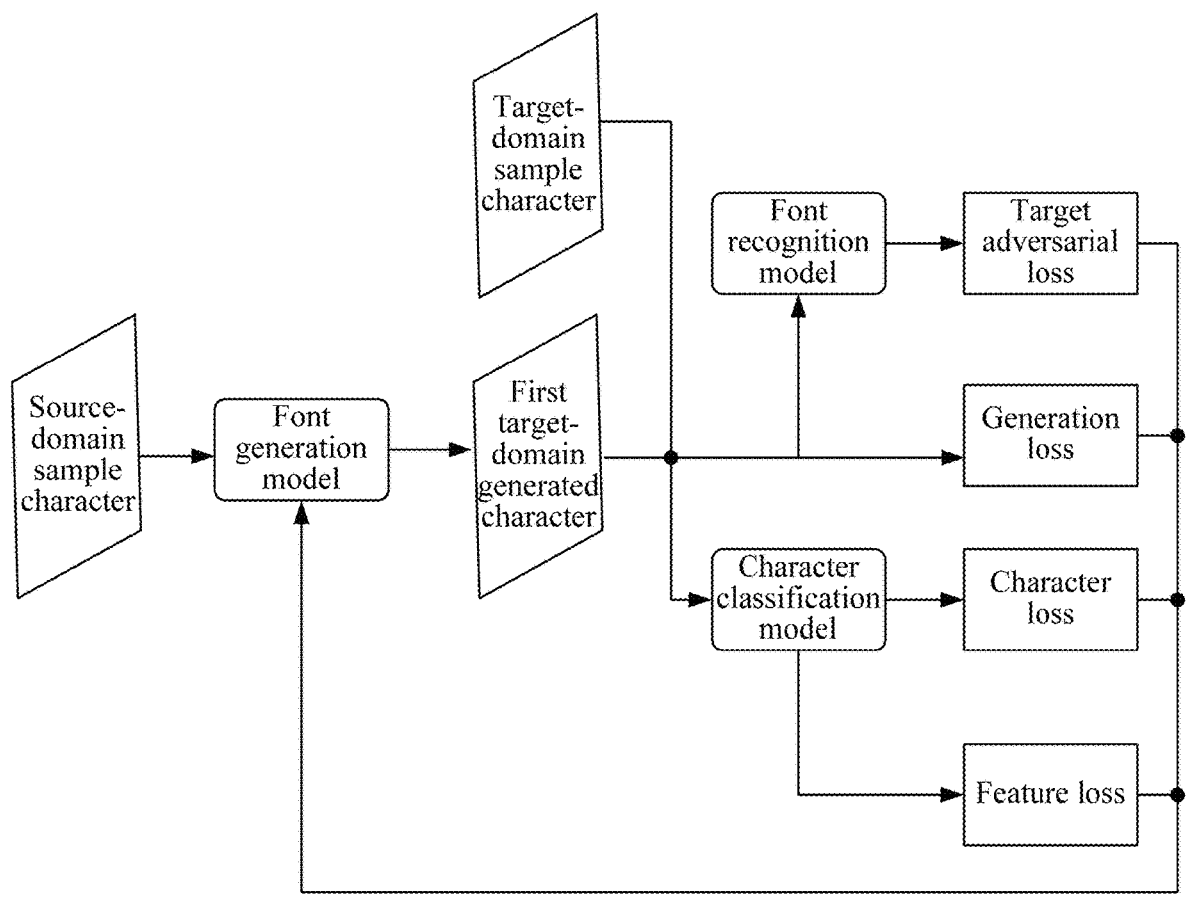
FIG. 6 is a principle diagram of a method for training a font generation model according to an embodiment of the present disclosure.

FIG. 6 is a principle diagram of a method for training a font generation model according to an embodiment of the present disclosure. As shown in FIG. 6, the complete training process of the font generation model may include the operations below. First, the source-domain sample character is input into the first generation model of the font generation model to obtain the first target-domain generated character and the first source-domain generated character. The target-domain sample character is input into the second generation model of the font generation model to obtain the second target-domain generated character and the second source-domain generated character. Further, the generation loss of the font generation model is calculated according to the source-domain sample character, the first target-domain generated character, the first source-domain generated character, the target-domain sample character, the second target-domain generated character and the second source-domain generated character. Then, the model parameter of the first generation model is updated according to the generation loss to perform the training of the font generation model. After the first training of the font generation model is completed, the first target-domain generated character is input into the pre-trained character classification model to obtain the character loss of the font generation model. The first target-domain generated character and the target-domain sample character are input into the character classification model to obtain the feature loss of the font generation model. Then, the model parameter of the first generation model is updated according to the character loss and the feature loss calculated by the character classification model to perform the training of the font generation model again. Moreover, the first target-domain generated character may also be input into the font recognition model to calculate and obtain the target adversarial loss of the font generation model, and the model parameter of the font generation model is updated for multiple rounds according to the target adversarial loss. It is to be noted that according to the character loss, the feature loss and the target adversarial loss, the training process of the font generation model may be executed synchronously or sequentially, which is not limited in the embodiments of the present disclosure.

Figure 7A:
FIGS. 7A-7B are comparison diagrams illustrating the effect of a font generation model that is obtained by being trained using a character loss according to an embodiment of the present disclosure.
Figure 7B:

FIGS. 7A-7B are comparison diagrams illustrating the effect of a font generation model that is obtained by being trained using the character loss according to an embodiment of the present disclosure. In an example, FIG. 7A is an image that includes a handwritten Chinese character "伶" and that is generated in a case where the font generation model is not constrained by the character loss. FIG. 7B is an image that includes a handwritten Chinese character "伶" and that is generated in a case where the font generation model is constrained by the character loss. Compared with the correct Chinese character "伶" the Chinese character "伶" in FIG. 7A misses a stroke of the dot. The Chinese character "伶" in FIG. 7B is a correct Chinese character "伶". Therefore, the font generation model constrained by the character loss can learn a correct character. In this manner, the incorrect character rate is reduced, and the accuracy of the model is improved.

Figure 8A:
FIGS. 8A-8C are comparison diagrams illustrating the effect of a font generation model that is obtained by being trained using a feature loss according to an embodiment of the present disclosure.
Figure 8B:
Figure 8C:

FIGS. 8A-8C are comparison diagrams illustrating the effect of a font generation model that is obtained by being trained using the feature loss according to an embodiment of the present disclosure. In an example, FIG. 8A is a real image that includes a handwritten Chinese character "彤", that is, the Chinese character "彤" in FIG. 8A is a real user's handwritten character. FIG. 8B is an image that includes a handwritten Chinese character "彤" and that is generated in a case where the font generation model is not constrained by the feature loss. FIG. 8C is an image that includes a handwritten Chinese character "彤" and that is generated in a case where the font generation model is constrained by the feature loss. Compared with the Chinese character "彤" in FIG. 8B, the Chinese character "彤" in FIG. 8C learns more features of the real user's handwritten Chinese character "彤" (that is, the Chinese character "彤" in FIG. 8A) and is more similar to the real user's handwritten Chinese character "彤".

Figure 9A:
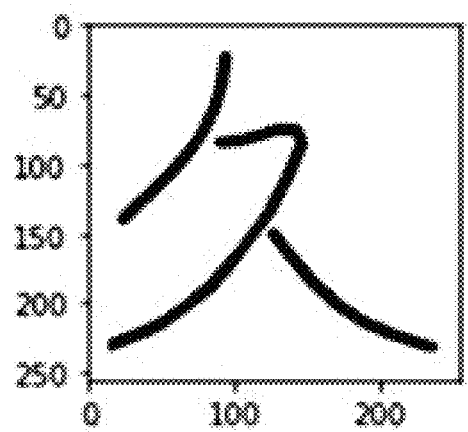
FIGS. 9A-9C are comparison diagrams illustrating the effect of a font generation model that is obtained by being trained using a target adversarial loss according to an embodiment of the present disclosure.
Figure 9B:
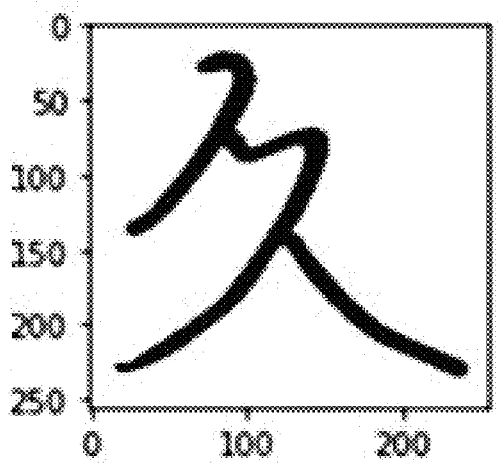
Figure 9C:
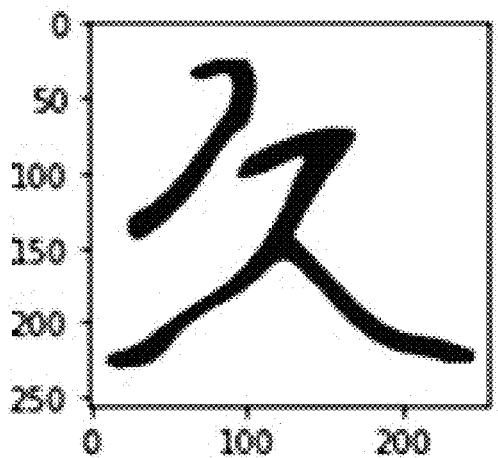

FIGS. 9A-9C are comparison diagrams illustrating the effect of a font generation model that is obtained by being trained using the target adversarial loss according to an embodiment of the present disclosure. In an example, FIG. 9A is a real image that includes a handwritten Chinese character "久", that is, the Chinese character "久", in FIG. 9A is a real user's handwritten character. FIG. 9B is an image that includes a handwritten Chinese character "久", and that is generated in a case where the font generation model is not constrained by the target adversarial loss. FIG. 9C is an image that includes a handwritten Chinese character "久", and that is generated in a case where the font generation model is constrained by the target adversarial loss. Compared with the Chinese character "久", in FIG. 9B, the strokes of the Chinese character "久", in FIG. 9C are smoother, and the stroke connections are more regular.

In the preceding technical schemes, the font generation model is trained through the use of various loss types such as the generation loss, the character loss, the feature loss and the target adversarial loss. In this manner, the ability of the font generation model to learn the font feature can be improved, and the incorrect character generation rate is reduced. Thus, the aesthetic and accuracy of a font generated by the font generation model can be improved, and the ability of the font generation model to generate a font-level font can be improved.

In the technical schemes of the present disclosure, the collection, storage, use, processing, transmission, provision, and disclosure of user personal information (such as user font information) involved are in compliance with provisions of relevant laws and regulations, and do not violate public order and good customs.

It is to be noted that any arrangement and combination of various technical features in the preceding embodiments are also within the scope of the present disclosure.

Figure 10:
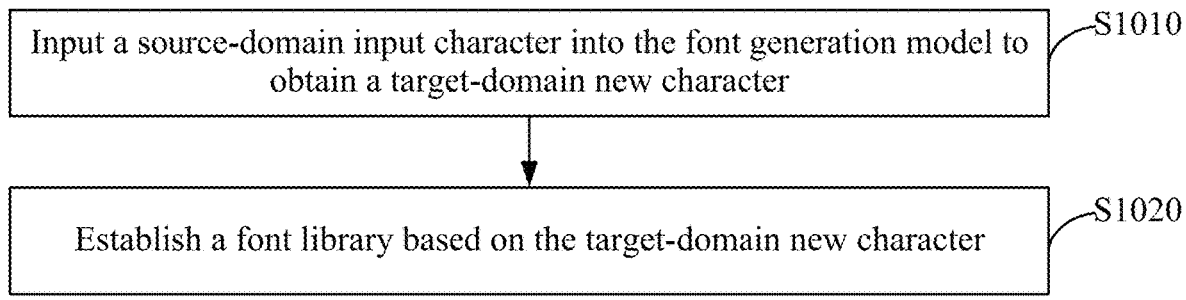
FIG. 10 is a flowchart of a method for establishing a font library according to an embodiment of the present disclosure.

In an example, FIG. 10 is a flowchart of a method for establishing a font library according to an embodiment of the present disclosure. This embodiment of the present disclosure may be applied to a case where the font library is established through the use of the font generation model trained and optimized according to the adversarial loss. The method may be executed by an apparatus for establishing a font library. The apparatus may be performed by software and/or hardware and may generally be integrated in an electronic device. The electronic device may be a terminal device, a server device, or the like. The type of electronic device that executes the method for establishing a font library is not limited in the embodiments of the present disclosure. Accordingly, as shown in FIG. 10, the method includes the operations below.

In S1010, a source-domain input character is input into the font generation model to obtain a target-domain new character.

The source-domain input character may be some characters of a source-domain font. The target-domain new character may be a new character that has the target-domain font style and needs to be generated. For example, the source-domain input character may be a regular script character image. The new character may be a handwritten character image. The regular script character image is input into the font generation model to obtain the handwritten character image. The font generation model is obtained by being trained using the method for training a font generation model described in any of the preceding embodiments.

In S1020, the font library is established based on the target-domain new character.

For example, the new character generated by the font generation model may be stored, and a font library having a handwritten font style is established. The font library may be applied to an input method, and a user can directly obtain a character having the handwritten font style by using the input method based on the font library. In this manner, diverse requirements of users are satisfied, and the user experience is improved.

Figure 11:
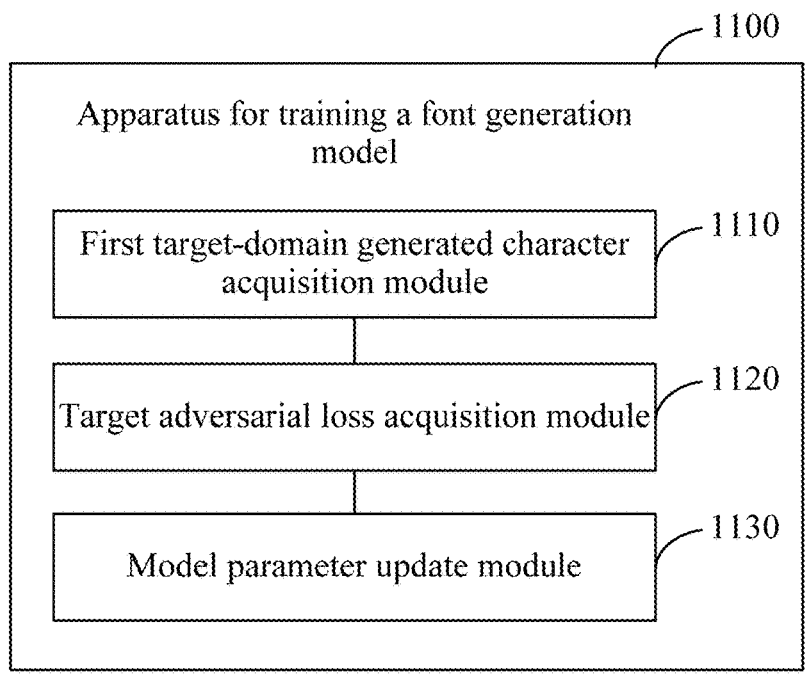
FIG. 11 is a diagram illustrating the structure of an apparatus for training a font generation model according to an embodiment of the present disclosure.

In an embodiment, FIG. 11 is a diagram illustrating the structure of an apparatus for training a font generation model according to an embodiment of the present disclosure. This embodiment of the present disclosure may be applied to the case where the font generation model is trained and optimized according to the adversarial loss. The apparatus is performed by software and/or hardware and is configured in an electronic device. The electronic device may be a terminal device, a server device, or the like.

As shown in FIG. 11, an apparatus 1100 for training a font generation model includes a first target-domain generated character acquisition module 1110, a target adversarial loss acquisition module 1120 and a model parameter update module 1130.

The first target-domain generated character acquisition module 1110 is configured to input the source-domain sample character into the font generation model to obtain the first target-domain generated character.

The target adversarial loss acquisition module 1120 is configured to input the first target-domain generated character into the font recognition model to obtain the target adversarial loss of the font generation model.

The first model parameter update module 1130 is configured to update the model parameter of the font generation model according to the target adversarial loss.

In this embodiment of the present disclosure, the source-domain sample character is input into the font generation model to obtain the first target-domain generated character, and the first target-domain generated character is input into the font recognition model to obtain the target adversarial loss of the font generation model. Then, the model parameter of the font generation model is updated for multiple rounds according to the target adversarial loss to perform the training of the font generation model. After the training of the font generation model is completed, the source-domain input character may be input into the font generation model to obtain the target-domain new character, and the font library is established based on the target-domain new character, thus solving that the existing font generation model is difficult to generate a font-level font. In this manner, the ability of the font generation model to learn the font feature can be improved. Therefore, the aesthetic of a font generated by the font generation model can be improved, and thus the ability of the font generation model to generate a font-level font can be improved.

In an embodiment, the apparatus for training a font generation model may further include a real sample character acquisition module, a fake sample character acquisition module and a font recognition model training module. The real sample character acquisition module is configured to acquire various types of source-domain sample characters and use the various types of source-domain sample characters as real sample characters. The fake sample character acquisition module is configured to use the first target-domain generated character as a fake sample character. The font recognition model training module is configured to train a binary classification model according to the real sample characters and the fake sample character to obtain the font recognition model.

In an embodiment the font generation model may be the cyclic network generation model and include a first generation model and a second generation model. The first model parameter update module 1130 is configured to update the model parameter of the first generation model for multiple rounds according to the target adversarial loss until the first generation model is determined to satisfy the model stability condition. The model stability condition includes that the current number of updates of the first generation model reaches the set number of times.

In an embodiment, the first target-domain generated character acquisition module 1110 may be configured to input the source-domain sample character into the first generation model to obtain a first target-domain generated character and a first source-domain generated character. The apparatus for training a font generation model may further include a second target-domain generated character acquisition module, a generation loss calculation module and a second model parameter update module. The second target-domain generated character acquisition module is configured to input the target-domain sample character into the second generation model to obtain a second target-domain generated character and a second source-domain generated character. The generation loss calculation module is configured to calculate the generation loss of the font generation model according to the source-domain sample character, the first target-domain generated character, the first source-domain generated character, the target-domain sample character, the second target-domain generated character and the second source-domain generated character. The second model parameter update module is configured to update a model parameter of the first generation model according to the generation loss.

In an embodiment, the apparatus for training a font generation model may further include a character loss acquisition module, a feature loss acquisition module and a third model parameter update module. The character loss acquisition module is configured to input the first target-domain generated character into a pre-trained character classification model to obtain a character loss of the font generation model. The feature loss acquisition module is configured to input the first target-domain generated character and the target-domain sample character into the character classification model to obtain a feature loss of the font generation model. The third model parameter update module is configured to update the model parameter of the first generation model according to the character loss and the feature loss.

In an embodiment, the character loss acquisition module may be configured to: input the first target-domain generated character into the character classification model to obtain a generated-character vector of the first target-domain generated character; and calculate the character loss according to the difference between the generated-character vector and a preset standard character vector.

In an embodiment, the character loss acquisition module may be configured to calculate the character loss according to the following formula:

$$LC = -\sum\nolimits_{0}^{n} x_i \log y_i$$

LC denotes the character loss. $x_i$ denotes an element with a subscript i in the generated-character vector. $y_i$ denotes an element with the subscript i in the standard character vector. i denotes an integer greater than or equal to 0 and less than or equal to n. n denotes the number of elements in the generated-character vector and in the standard character vector.

In an embodiment, the character classification model may include a plurality of feature layers. The feature loss acquisition module is configured to: input the first target-domain generated character into the character classification model to obtain a generated-character feature map output by each feature layer of the character classification model; input the target-domain sample character into the character classification model to obtain a sample character feature map output by each feature layer of the character classification model; and calculate the difference between the generated-character feature map of a target feature layer and the sample character feature map of the target feature layer to obtain the feature loss.

In an embodiment, the feature loss acquisition module may be configured to: calculate the absolute value of the difference value between the pixel value of the pixel at each position in the generated-character feature map and the pixel value of the pixel at a corresponding position in the sample character feature map to obtain the difference between the pixel at each position in the generated-character feature map and the pixel at the corresponding position in the sample character feature map; and determine the pixel difference between the generated-character feature map and the sample character feature map according to the differences between pixels at a plurality of positions in the generated-character feature map and pixels at corresponding positions in the sample character feature map.

In an embodiment, the source-domain sample character may be an image having a target source-domain font style.

The preceding apparatus for training a font generation model may execute the method for training a font generation model according to any embodiment of the present disclosure and has functional modules and beneficial effects corresponding to the method executed. For technical details not described in detail in this embodiment, reference may be made to the method for training a font generation model according to any embodiment of the present disclosure.

Figure 12:
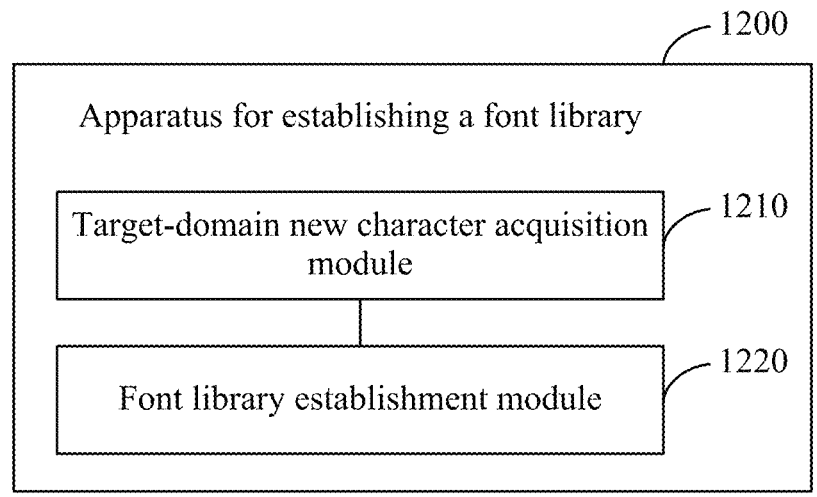
FIG. 12 is a diagram illustrating the structure of an apparatus for establishing a font library according to an embodiment of the present disclosure.

In an embodiment, FIG. 12 is a diagram illustrating the structure of an apparatus for establishing a font library according to an embodiment of the present disclosure. This embodiment of the present disclosure may be applied to the case where the font library is established through the use of the font generation model trained and optimized according to the adversarial loss. The apparatus is performed by software and/or hardware and is configured in an electronic device. The electronic device may be a terminal device, a server device, or the like.

As shown in FIG. 12, an apparatus 1200 for establishing a font library includes a target-domain new character acquisition module 1210 and a font library establishment module 1220.

The target-domain new character acquisition module 1210 is configured to input a source-domain input character into a font generation model to obtain a target-domain new character.

The font library establishment module 1220 is configured to establish the font library based on the target-domain new character.

The font generation model is obtained by being trained using the apparatus for training a font generation model according to any embodiment of the present disclosure.

The preceding apparatus for establishing a font library may execute the method for establishing a font library according to any embodiment of the present disclosure and has functional modules and beneficial effects corresponding to the method executed. For technical details not described in detail in this embodiment, reference may be made to the method for establishing a font library according to any embodiment of the present disclosure.

In an example, the present disclosure further provides an electronic device, a readable storage medium and a computer program product.

Figure 13:
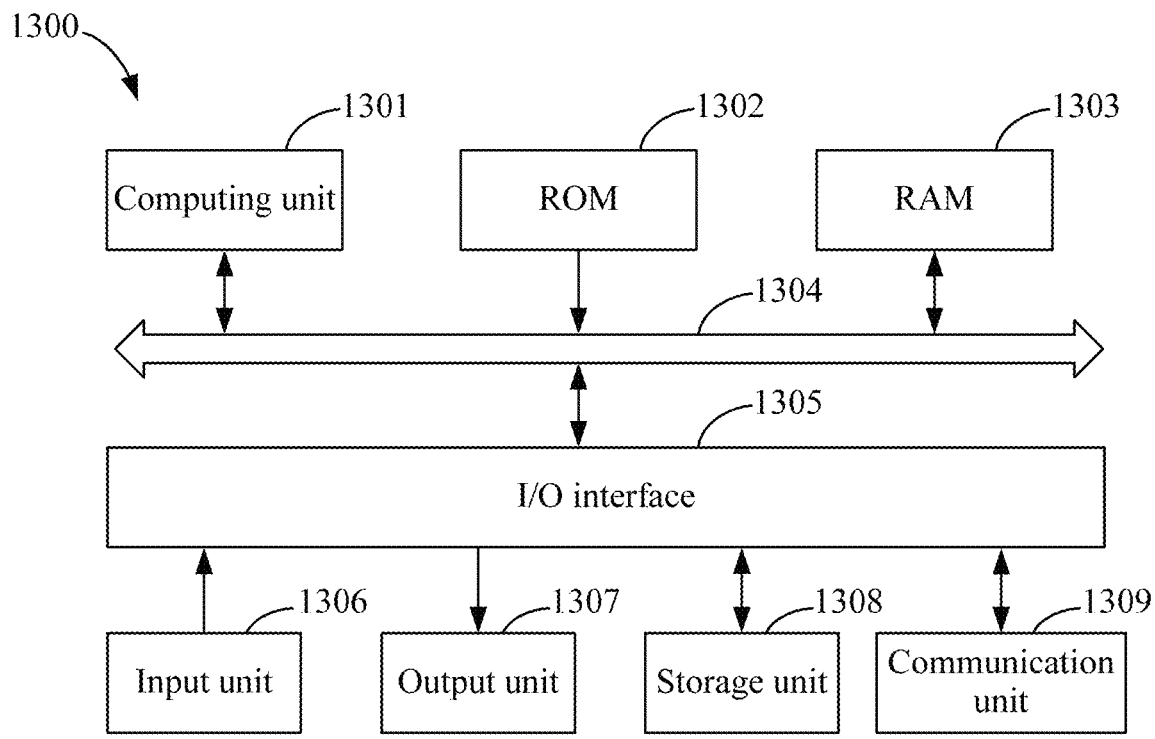
FIG. 13 is a diagram illustrating the structure of an electronic device for performing the method for training a font generation model or the method for establishing a font library according to an embodiment of the present disclosure.

FIG. 13 is a block diagram illustrative of an exemplary electronic device 1300 that may be used for implementing embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 13, the device 1300 includes a computing unit 1301. The computing unit 1301 may perform various types of appropriate operations and processing based on a computer program stored in a read-only memory (ROM) 1302 or a computer program loaded from a storage unit 1308 to a random-access memory (RAM) 1303. Various programs and data required for operations of the device 1300 may also be stored in the RAM 1303. The computing unit 1301, the ROM 1302 and the RAM 1303 are connected to each other through a bus 1304. An input/output (I/O) interface 1305 is also connected to the bus 1304.

Multiple components in the device 1300 are connected to the I/O interface 1305. The components include an input unit 1306 such as a keyboard and a mouse, an output unit 1307 such as various types of displays and speakers, the storage unit 1308 such as a magnetic disk and an optical disc, and a communication unit 1309 such as a network card, a modem and a wireless communication transceiver. The communication unit 1309 allows the device 1300 to exchange information/data with other devices over a computer network such as the Internet and/or various telecommunications networks.

The computing unit 1301 may be various general-purpose and/or special-purpose processing components having processing and computing capabilities. Some examples of the computing unit 1301 include, but are not limited to, central processing units (CPUs), graphics processing units (GPUs), various special-purpose artificial intelligence (AI) computing chips, various computing units running machine learning models and algorithms, digital signal processors (DSPs) and any suitable processors, controllers and microcontrollers. The computing unit 1301 performs various methods and processing described above, such as the method for training a font generation model or the method for establishing a font library. For example, in some embodiments, the method for training a font generation model or the method for establishing a font library may be implemented as a computer software program tangibly contained in a machine-readable medium such as the storage unit 1308. In some embodiments, part or all of computer programs may be loaded and/or installed on the equipment 1300 via the ROM 1302 and/or the communication unit 1309. When the computer programs are loaded into the RAM 1303 and performed by the computing unit 1301, one or more steps of the preceding method for training a font generation model and/or the method for establishing a font library may be performed. Alternatively, in other embodiments, the computing unit 1301 may be configured, in any other suitable manner (for example, by means of firmware), to perform the method for training a font generation model and/or the method for establishing a font library.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting the data and instructions to the memory system, the at least one input apparatus, and the at least one output apparatus.

Program codes for implementing the methods of the present disclosure may be compiled in any combination of one or more programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any suitable combination thereof.

In order to provide an interaction with a user, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. The clients and servers are usually far away from one another and generally interact through the communication network. The relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak business scalability in conventional physical hosts and virtual private server (VPS) services. The server may also be a server of a distributed system, or a server combined with a blockchain.

In this embodiment of the present disclosure, the source-domain sample character is input into the font generation model to obtain the first target-domain generated character, and the first target-domain generated character is input into the font recognition model to obtain the target adversarial loss of the font generation model. Then, the model parameter of the font generation model is updated for multiple rounds according to the target adversarial loss to perform the training of the font generation model. After the training of the font generation model is completed, the source-domain input character may be input into the font generation model to obtain the target-domain new character, and the font library is established based on the target-domain new character, thus solving that the existing font generation model is difficult to generate a font-level font. In this manner, the ability of the font generation model to learn the font feature can be improved. Therefore, the aesthetic of a font generated by the font generation model can be improved, and thus the ability of the font generation model to generate a font-level font can be improved. Thus, diverse requirements of users are satisfied, and the user experience is improved.

It is to be understood that various forms of the preceding flows may be used with steps reordered, added, or removed. For example, the steps described in the present disclosure may be executed in parallel, in sequence or in a different order as long as the desired result of the technical solutions disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made according to design requirements and other factors. Any modification, equivalent substitution, improvement and the like made within the spirit and principle of the present disclosure falls within the scope of the present disclosure.

What is claimed is:

1. A method for training a font generation model, comprising:
    inputting a source-domain sample character into the font generation model to obtain a first target-domain generated character, wherein the font generation model is a cyclic network generation model and comprises a first generation model and a second generation model;
    inputting the first target-domain generated character into a font recognition model to obtain a target adversarial loss of the font generation model;
    updating a model parameter of the first generation model for multiple rounds according to the target adversarial loss until the first generation model is determined to satisfy a model stability condition, wherein the model stability condition comprises that a current number of updates of the first generation model reaches a set number of times; and
    inputting the first target-domain generated character into a pre-trained character classification model to obtain a character loss of the font generation model; inputting the first target-domain generated character and the target-domain sample character into the character classification model to obtain a feature loss of the font generation model; and updating the model parameter of the first generation model according to the character loss and the feature loss.

2. The method according to claim 1, further comprising:
    obtaining various types of source-domain sample characters and using the various types of source-domain sample characters as real sample characters;
    using the first target-domain generated character as a fake sample character; and
    training a binary classification model according to the real sample characters and the fake sample character to obtain the font recognition model.

3. The method according to claim 1, wherein inputting the source-domain sample character into the font generation model to obtain the first target-domain generated character comprises:
    inputting the source-domain sample character into the first generation model to obtain the first target-domain generated character and a first source-domain generated character; and
    the method further comprises:
    inputting a target-domain sample character into the second generation model to obtain a second target-domain generated character and a second source-domain generated character;
    calculating a generation loss of the font generation model according to the source-domain sample character, the first target-domain generated character, the first source-domain generated character, the target-domain sample character, the second target-domain generated character and the second source-domain generated character; and
    updating the model parameter of the first generation model according to the generation loss.

4. The method according to claim 1, wherein inputting the first target-domain generated character into the pre-trained character classification model to obtain the character loss of the font generation model comprises:
    inputting the first target-domain generated character into the character classification model to obtain a generated-character vector of the first target-domain generated character; and
    calculating the character loss according to a difference between the generated-character vector and a preset standard character vector.

5. The method according to claim 1, wherein the character classification model includes a plurality of feature layers; and
    inputting the first target-domain generated character and the target-domain sample character into the character classification model to obtain the feature loss of the font generation model comprises:
    inputting the first target-domain generated character into the character classification model to obtain a generated-character feature map output by each feature layer of the character classification model;
    inputting the target-domain sample character into the character classification model to obtain a sample character feature map output by each feature layer of the character classification model; and
    calculating a difference between the generated-character feature map of a target feature layer and the sample character feature map of the target feature layer to obtain the feature loss.

6. The method according to claim 5, wherein calculating the difference between the generated-character feature map of the target feature layer and the sample character feature map of the target feature layer comprises:
    calculating an absolute value of a difference value between a pixel value of a pixel at each position in the generated-character feature map and a pixel value of a pixel at a corresponding position in the sample character feature map to obtain a difference between the pixel at each position in the generated-character feature map and the pixel at the corresponding position in the sample character feature map; and
    determining a pixel difference between the generated-character feature map and the sample character feature map according to differences between pixels at a plurality of positions in the generated-character feature map and pixels at corresponding positions in the sample character feature map.

7. The method according to claim 1, wherein the source-domain sample character is an image having a target source-domain font style.

8. A method for establishing a font library, comprising:
inputting a source-domain input character into a font generation model to obtain a target-domain new character; and
establishing the font library based on the target-domain new character,
wherein the font generation model is obtained by being trained using the method for training a font generation model according to claim 1.

9. An electronic device, comprising:
at least one processor; and
a memory communicatively connected to the at least one processor, wherein
the memory stores an instruction executable by the at least one processor to enable the at least one processor to execute the following steps:
inputting a source-domain sample character into the font generation model to obtain a first target-domain generated character, wherein the font generation model is a cyclic network generation model and comprises a first generation model and a second generation model;
inputting the first target-domain generated character into a font recognition model to obtain a target adversarial loss of the font generation model;
updating a model parameter of the first generation model for multiple rounds according to the target adversarial loss until the first generation model is determined to satisfy a model stability condition, wherein the model stability condition comprises that a current number of updates of the first generation model reaches a set number of times; and
inputting the first target-domain generated character into a pre-trained character classification model to obtain a character loss of the font generation model; inputting the first target-domain generated character and the target-domain sample character into the character classification model to obtain a feature loss of the font generation model; and updating the model parameter of the first generation model according to the character loss and the feature loss.

10. The electronic device according to claim 9, wherein the at least one processor is caused to further execute:
obtaining various types of source-domain sample characters and using the various types of source-domain sample characters as real sample characters;
using the first target-domain generated character as a fake sample character; and
training a binary classification model according to the real sample characters and the fake sample character to obtain the font recognition model.

11. The electronic device according to claim 9, wherein the at least one processor is caused to execute inputting the source-domain sample character into the font generation model to obtain the first target-domain generated character by:
inputting the source-domain sample character into the first generation model to obtain the first target-domain generated character and a first source-domain generated character; and
the at least one processor is caused to further execute:
inputting a target-domain sample character into the second generation model to obtain a second target-domain generated character and a second source-domain generated character;
calculating a generation loss of the font generation model according to the source-domain sample character, the first target-domain generated character, the first source-domain generated character, the target-domain sample character, the second target-domain generated character and the second source-domain generated character; and
updating the model parameter of the first generation model according to the generation loss.

12. The electronic device according to claim 9, wherein the at least one processor is caused to execute inputting the first target-domain generated character into the pre-trained character classification model to obtain the character loss of the font generation model by:
inputting the first target-domain generated character into the character classification model to obtain a generated-character vector of the first target-domain generated character; and
calculating the character loss according to a difference between the generated-character vector and a preset standard character vector.

13. The electronic device according to claim 9, wherein the character classification model includes a plurality of feature layers; and
the at least one processor is caused to execute inputting the first target-domain generated character and the target-domain sample character into the character classification model to obtain the feature loss of the font generation model by:
inputting the first target-domain generated character into the character classification model to obtain a generated-character feature map output by each feature layer of the character classification model;
inputting the target-domain sample character into the character classification model to obtain a sample character feature map output by each feature layer of the character classification model; and
calculating a difference between the generated-character feature map of a target feature layer and the sample character feature map of the target feature layer to obtain the feature loss.

14. The electronic device according to claim 13, wherein the at least one processor is caused to execute calculating the difference between the generated-character feature map of the target feature layer and the sample character feature map of the target feature layer by:
calculating an absolute value of a difference value between a pixel value of a pixel at each position in the generated-character feature map and a pixel value of a pixel at a corresponding position in the sample character feature map to obtain a difference between the pixel at each position in the generated-character feature map and the pixel at the corresponding position in the sample character feature map; and
determining a pixel difference between the generated-character feature map and the sample character feature map according to differences between pixels at a plurality of positions in the generated-character feature map and pixels at corresponding positions in the sample character feature map.

15. An electronic device, comprising:
at least one processor; and
a memory communicatively connected to the at least one processor, wherein
the memory stores an instruction executable by the at least one processor to enable the at least one processor to execute the following steps:

inputting a source-domain input character into the font generation model of the electronic device according to claim 9 to obtain a target-domain new character; and establishing the font library based on the target-domain new character.

16. A non-transitory computer-readable storage medium storing a computer instruction to enable a computer to execute the following steps:

inputting a source-domain sample character into the font generation model to obtain a first target-domain generated character, wherein the font generation model is a cyclic network generation model and comprises a first generation model and a second generation model;

inputting the first target-domain generated character into a font recognition model to obtain a target adversarial loss of the font generation model;

updating a model parameter of the first generation model for multiple rounds according to the target adversarial loss until the first generation model is determined to satisfy a model stability condition, wherein the model stability condition comprises that a current number of updates of the first generation model reaches a set number of times; and inputting the first target-domain generated character into a pre-trained character classification model to obtain a character loss of the font generation model; inputting the first target-domain generated character and the target-domain sample character into the character classification model to obtain a feature loss of the font generation model; and updating the model parameter of the first generation model according to the character loss and the feature loss.

\* \* \* \* \*